US011909285B2

(12) United States Patent
Ahmed

(10) Patent No.: US 11,909,285 B2
(45) Date of Patent: Feb. 20, 2024

(54) HAIRPIN WINDING ELECTRIC MACHINE

(71) Applicant: FORD GLOBAL TECHNOLOGIES, LLC, Dearborn, MI (US)

(72) Inventor: Adeeb Ahmed, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 17/537,873

(22) Filed: Nov. 30, 2021

(65) Prior Publication Data

US 2023/0170750 A1  Jun. 1, 2023

(51) Int. Cl.
*H02K 3/04* (2006.01)
*H02K 3/28* (2006.01)
*H02K 3/12* (2006.01)

(52) U.S. Cl.
CPC .......... *H02K 3/28* (2013.01); *H02K 3/04* (2013.01); *H02K 3/12* (2013.01)

(58) Field of Classification Search
CPC ............... H02K 3/04; H02K 3/12; H02K 3/28
See application file for complete search history.

(56) References Cited

U.S. PATENT DOCUMENTS

| 10,923,978 B2 | 2/2021 | Shiah et al. |
| 2007/0018525 A1 | 1/2007 | Cai et al. |
| 2019/0222078 A1 | 7/2019 | Liang et al. |
| 2020/0067362 A1 | 2/2020 | Shiah et al. |
| 2020/0395804 A1 | 12/2020 | Ahmed et al. |
| 2021/0218305 A1 | 7/2021 | Tang et al. |
| 2021/0234444 A1 | 7/2021 | Ramet et al. |

FOREIGN PATENT DOCUMENTS

| CN | 111293811 A | 6/2020 |
| WO | 2021064122 A1 | 4/2021 |

*Primary Examiner* — Ramon M Barrera
(74) *Attorney, Agent, or Firm* — David B Kelley; Brooks Kushman P.C.

(57) ABSTRACT

An electric machine includes a stator core and a hairpin winding. The stator core defines slots that are circumferentially arranged between an inner diameter and an outer diameter of the stator core. Each slot has a plurality of pin positions that is arranged in a direction that extends from the inner diameter toward the outer diameter. The hairpin winding has a plurality of electrical paths of interconnected hairpins disposed within the slots. Each of the plurality of electrical paths of interconnected hairpins has a plurality of typical hairpins and an atypical hairpin. Each typical hairpin has a crown pitch of eight, nine, or ten, slots and opposing outwardly extending twist pitches along each end of the typical hairpin of four and one half slots. Each atypical hairpin, has an outwardly extending twist pitch and an inwardly extending twist pitch on opposing respective ends of the atypical hairpin.

20 Claims, 8 Drawing Sheets

U-PHASE

V-PHASE

W-PHASE

W-PHASE

HAIRPIN WINDING ELECTRIC MACHINE

TECHNICAL FIELD

The present disclosure relates to electric machines and more specifically to electric machines that include hairpin windings.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

An electric machine includes a stator core and hairpin windings. The stator core defines fifty-four slots that are circumferentially arranged between an inner diameter and, an outer diameter of the stator core. Each slot has six pin positions that, are arranged in a direction that extends from the inner diameter toward the outer diameter. The hairpin windings have three electrical phases. Each electrical phase has three parallel electrical paths of interconnected hairpins disposed within the slots. Each of the electrical paths of interconnected hairpins have first, second, third, and fourth types of hairpins. Each of the first type of hairpins has a first crown portion spanning eight slots and first and second opposing outwardly extending twist portions. Each of the first and second twist portions spans four and one half slots. Each of the second type of hairpins has a second crown portion spanning nine slots and third and fourth opposing outwardly extending twist portions. Each, of the third and fourth twist portions spans four and one half slots. Each of the third type of hairpins has a third crown portion spanning ten slots and fifth and sixth opposing outwardly extending twist portions. Each of the fifth and sixth twist portions span four and one, half slots. Each of the fourth type of hairpins has a fourth crown portion, a seventh outwardly extending twist portion, and an inwardly extending twist portion on an opposing side of the fourth crown, portion relative, to the seventh outwardly extending twist portion.

An electric machine includes a stator core and hairpin windings. The stator core defines slots that are circumferentially arranged between an inner diameter and an outer diameter of the stator core. Each slot has a plurality of pin positions that is arranged in a direction that extends from the inner diameter toward the outer diameter. The hairpin windings have a plurality of electrical paths of interconnected hairpins disposed within the slots. Each of the plurality of electrical paths of interconnected hairpins has a plurality of typical hairpins and an atypical hairpin. Each typical hairpin has a crown pitch of eight, nine, or ten, slots and opposing outwardly extending twist pitches along each end of the typical hairpin of four and one half slots. Each atypical hairpin has an outwardly extending twist pitch and an inwardly extending twist pitch on opposing respective ends of the atypical hairpin.

An electric machine includes a stator core and hairpin windings. The stator core defines slots that are circumferentially arranged between an inner diameter and an outer diameter of the stator core. Each slot has a plurality of pin positions that is arranged in a direction that extends from the inner diameter toward the outer diameter. The hairpin windings have a plurality of electrical paths of interconnected hairpins disposed within the slots. Each of the plurality of electrical paths of interconnected hairpins has a plurality of typical hairpins and a single atypical hairpin. Each typical, hairpin has first and second opposing outwardly extending twist portions. Each atypical hairpin has a third outwardly extending twist portion and an inwardly extending twist portion disposed on an opposing end of the atypical hairpin relative to the third outwardly extending twist portion. Each atypical hairpin is connected to one of the typical hairpins via a jumper at the inwardly extending twist portion and along an outer periphery of the hairpin windings.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
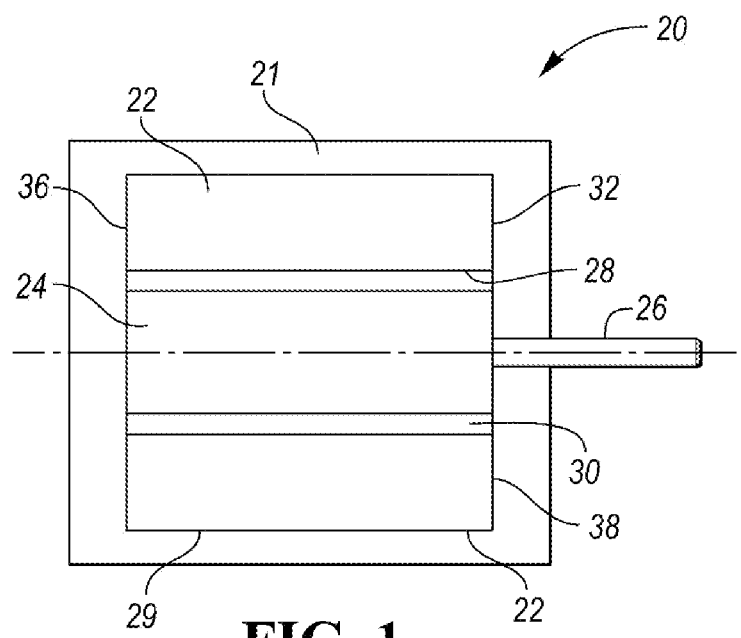
FIG. 1 is a schematic diagram of an electric machine.

Referring to FIG. 1, an electric machine 20 may be used in a vehicle such as a fully electric vehicle or a hybrid-electric vehicle. The electric machine 20 may be referred to as an electric motor, a traction motor, a generator, or the like.

The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by an electrical power source such as a traction battery of the vehicle. The traction battery may supply a high-voltage direct current (DC) output from one or more battery-cell arrays, sometimes referred to as battery-cell stacks, within, the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the fraction battery and the electric machine 20. For example, a suitable traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 2:
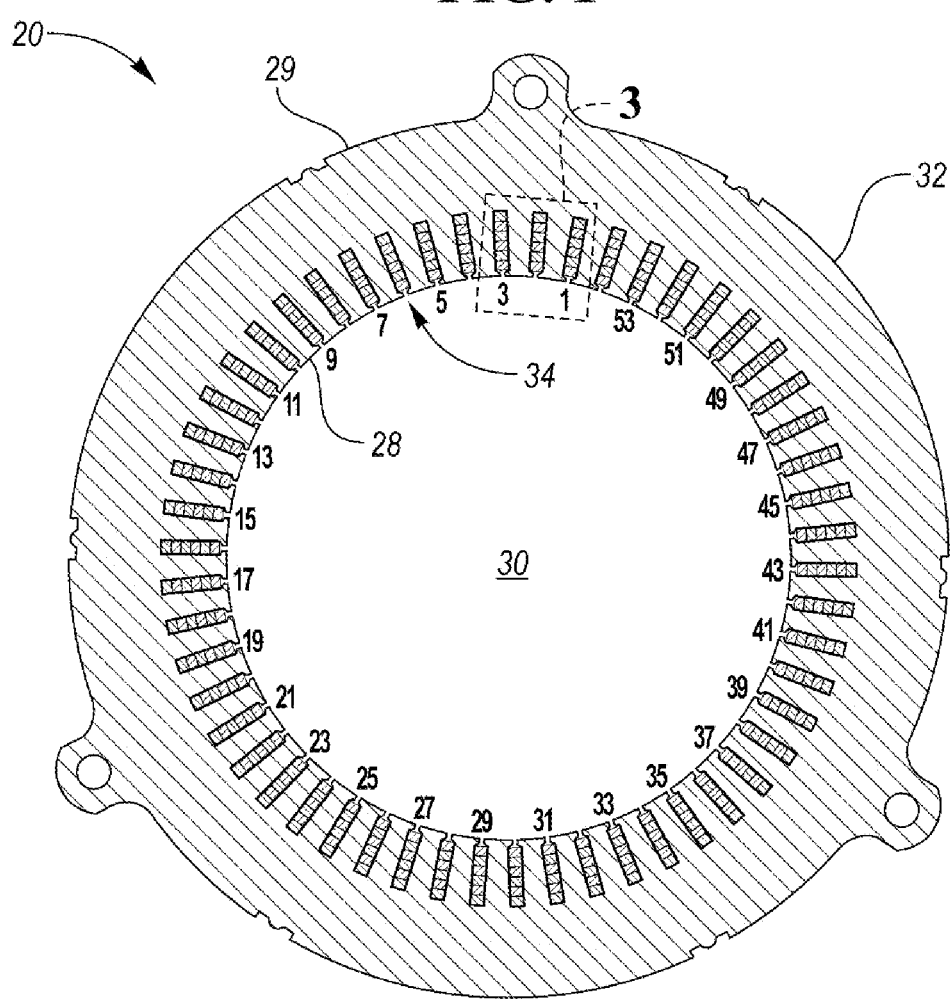
FIG. 2 is a cross-sectional end view of a stator of the electric machine.

Referring to FIGS. 1 and 2, the electric machine 20 may include a housing 21 that encloses the stator 22 and the rotor 24. The stator 22 is fixed to the housing 21 and includes a cylindrical stator core 32 having an inner diameter (ID) 28 that defines a hole 30 and an outer diameter (OD) 29. The stator core 32 may be formed from a plurality of stacked laminations. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a shaft 26 that extends through the housing 21. The shaft 26 may be supported by bearings (not shown) that are secured to the housing 21 such that the rotor 24 and, shaft 26 may rotate relative to the housing 21 and stator 22. The shaft 26 is configured to couple with a drivetrain of the vehicle to output torque for vehicle propulsion or receive mechanical regenerative energy from vehicle motion.

The stator core 32 defines circumferentially-arranged slots 34 (see, e.g., FIG. 2) around the stator core 32 and extending outward from the inner diameter 28. The slots 34 may be equally spaced around the circumference, may be circumferentially arranged between the inner diameter 28 and the outer diameter 29 of the stator core 32 (e.g., the slots 34 may extend radially from the inner diameter 28 to the outer diameter 29 of the stator core 32), and may extend axially from a first end 36 of the stator core 32 to a second end 38. Each slot 34 has a plurality of pin positions that is arranged in a direction that extends from the inner diameter 28 toward the outer diameter 29 of the stator core. In the illustrated embodiment, the stator core 32 defines fifty-four slots. Each of the three electrical phases is formed by hairpin windings 40 that are disposed within the fifty-four slots. The hairpin windings 40 of each phase form six poles. Each pole includes a portion of the hairpin windings 40 that occupies three consecutive slots of the fifty-four slots.

The slots 34 are spaced by a circumferential distance measured between the center lines of two adjacent slots. This distance can be used as a unit of distance (hereinafter "a slot") for relating to, and measuring, other components of the stator 22. The distance unit "slot" is also sometimes referred to as "slot pitch" or "slot span." The slots 34 are also referenced by numbers 1 through 54 in the counterclockwise direction with the odd number slots being labeled for convenience. The slots may be characterized as odd slots (i.e., slots 1, 3, 5, etc.) and even slots (i.e., slots 2, 4, 6, etc.). The odd and even designation is for ease of description in explaining the arrangement of the windings 40, and the structure of odd and even slots may be the same.

The electric machine 20 includes hairpin windings 40 routed through the slots 34 of the stator core 32. Hairpin winding configurations can improve efficiency for electric machines used in vehicles as well as other applications. The hairpin windings 40 improve efficiency by providing a greater amount of stator conductors to reduce resistance of the winding 40 without encroaching into space reserved for the electrical steel and the magnetic flux path. Each of the three electrical phases is formed by the hairpin windings 40 that are disposed within the slots 34. The hairpin windings 40 of each of the three electrical phase forms six poles. Each pole includes a portion of the hairpin windings 40 that occupies three sequential or three consecutive slots 34.

Using three slots per pole per phase helps to reduce the unwanted harmonics at the expense of a more complicated winding structure. To make a motor with a desired current and voltage ratings, it is often required to connect the hairpin windings in different, series and/or parallel combinations. One challenge in such operation is to achieve a balanced parallel path that does not produce a circulating current between the parallel paths. The task becomes more challenging for hairpin windings, as the rigid hairpins are may not be suitable for producing random connections between pins. It necessitates a careful winding design that can produce balanced parallel circuitry without requiring substantial manufacturing complexity. A balanced winding topology that includes three slots per pole per phase is describe herein. More specifically, six unbalanced paths per phase are paired into three paths via jumpers that result in a balanced circuitry. The three paths share a comparable number of slots occupancy in the ID and OD regions of the stator 22. The three paths also share comparable slot occupancy along all circumferential directions in order to avoid an imbalance due to manufacturing tolerance or due to rotor imbalance.

The electric machine 20 may be a three-phase current electric machine in which the hairpin windings 40 are arranged in a U-phase, a V-phase, and a W-phase. The phases may be referred to first, second, and third phases in any order. In the examples of the present disclosure, each phase includes a plurality of individual hairpin conductors arranged in parallel winding paths.

Figure 3:
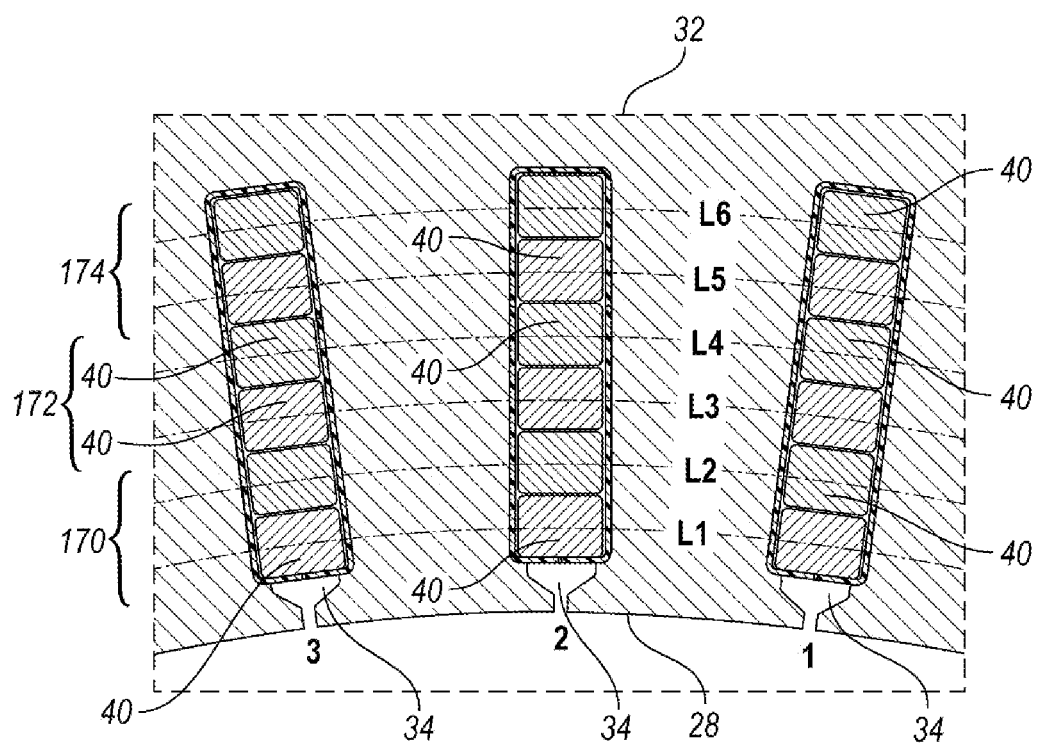
FIG. 3 is a magnified view of a portion of FIG. 2.

Referring to FIG. 3, the slots 34 may include an inner radial layer 170 of hairpins, a middle radial layer 172 of hairpins, and an outer radial layer 174 of hairpins. Each of the layers may include at least two radial pin positions that are adjacent to each other. In the illustrated embodiment, each slot 34 has six sequential pin positions (i.e., L1 through L6) in a one-by-six linear arrangement, however, other arrangements are contemplated. The first position L1, is nearest the ID 28 of the stator core 32 and the sixth, position L6 is nearest the OD 29 of the stator core 32. The innermost radial layer 170 includes both the first position L1 and the second position L2. The middle radial layer 172 includes both the third position L3 and the fourth position L4. The outermost radial layer 174 includes both the fifth position L5 and the sixth position L6.

Figure 4:
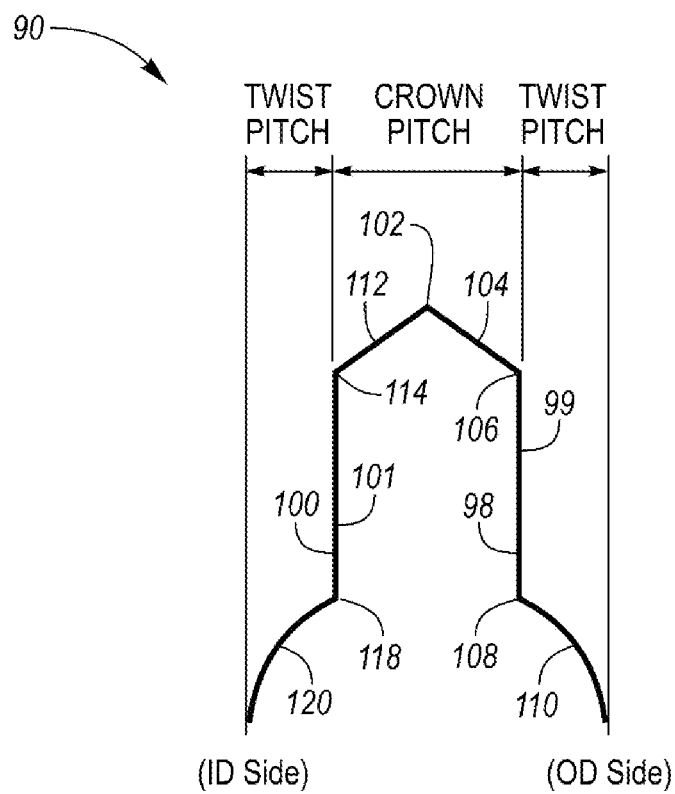
FIG. 4 is a front view of a generic hairpin.

Referring to FIG. 4, a generic hairpin is schematically depicted to show the general configuration. The hairpins are generally U-shaped and include a pair of legs joined by a crown. Each of a plurality of hairpins are installed in the stator core 32 by routing each leg portion through a corresponding one of the slots 34. Each hairpin may be installed from the same end of the stator core 32 (e.g., from end 36) so that once installed all of the crowns are located on one end of the stator, and the ends of the legs all are located on the opposing end (e.g., end 38). Generally, end 36 may be referred to as the crown end and end 38 may be referred to as the weld end. Once installed, the legs of the hairpins are bent away from each other to form twists that connect with the twists of other hairpins. The ends of corresponding hairpins are joined by an electrically conductive connection such as a weld. The connections may be arranged in rows. The windings 40 may be jumper-less (i.e., each hairpin is interconnected to another hairpin directly) or may include a minimum number of jumpers. A jumper is a conductor that is typically disposed, at one of the ends of the stator core, i.e., does not extend through a slot, and interconnects hairpins that are spaced far enough apart that they cannot be directly connected to each other. Jumpers add material to the windings and require additional manufacturing. Material usage can be reduced, and manufacturing efficiencies can be gained, by designing windings that do not require jumpers or only have a minimum number of jumpers.

Each arrangement may include hairpins as described in FIG. 4. Hairpin 90 may be formed from a single piece of metal such as copper, aluminum, silver, or any other electrically conductive material. The hairpin 90 may include a first leg 98 joined to a second leg 100 at a vertex 102. The first leg 98 is disposed within in one of the slots 34 and the second leg 100 is disposed in another of the slots 34 that is spaced apart by a span of slots. The span of slots 34 between the first leg 98 and the second leg 100 may be referred to as the crown pitch. The first leg 98 includes a straight portion 99 disposed within a slot 34 and a first angled portion 104 that extends between the vertex 102 and the straight portion 99. The straight portion 99 and the angled portion 104 are joined at a first bend 106. The first leg 98 also includes a twist portion 110 that is angled outward at a second bend 108. The second leg 100 includes a straight portion 101 disposed within a slot 34 and a first angled portion 112 that extends between the vertex 102 and the straight portion 101. The first and second angled portions 104, 112 and the vertex 102 may be collectively referred to as a crown. The straight portion 101 and the angled portion 112 are joined at a first bend 114. The second leg 100 also includes a twist portion 120 that is angled outward at a second bend 118. The twists 110, 120 are angled in opposing directions to extend outward and away from the crown of the hairpin 90 to connect with adjacent pins of the wiring path. Some hairpins, however, may have one or more twists that are angled inward and toward the crown the crown of the hairpin. The span of slots 34 of the twists 110, 120 from the respective straight portions 99, 101 to the respective ends of the twists 110, 120 may be referred to as the twist pitches. Twist portions that are angled outward, as illustrated in FIG. 4, may be said to have a positive twist pitch and twist portions that are angled inward may be said to have a negative twist pitch.

The hairpin 90 may be fabricated by first forming the vertex 102, the first angled portions 104, 112, and two extended straight portions. Then, the hairpin 90 is installed into the stator 22 by inserting the extended straight portions into the slots 34 of the stator 22. The second bends 108, 118 and the twists 110, 120 may be formed after the hairpin 90 is installed through the slots 34 by bending the extended legs as desired. The first and last regular pins of a wiring path may have a longer or shorter twist to facilitate connection with the terminal leads or neutral connections.

A neutral connection 52 may include a body such as a strip of conductive metal or other material. The neutral connection 52 includes openings that connect with hairpins. In the examples of the present disclosure, the neutral connection defines nine openings grouped as sets of three. Each of the groupings are associated with one of the phases such that each of the U-phase, the V-phase, and the W-phase are allocated three openings. The neutral connection 52 may be connected directly to the twist portions of hairpins that are positioned at a most radially inward position of the hairpins (i.e., the neutral connection may be connected to hairpins located at the first position L1). The twist portions that connect to the neutral connection 52 may not need to be lengthened to accommodate the weld portion since there may be sufficient clearance for the neutral connection 52 to be attached to the inside of the most radially inward hairpins.

Figure 5:
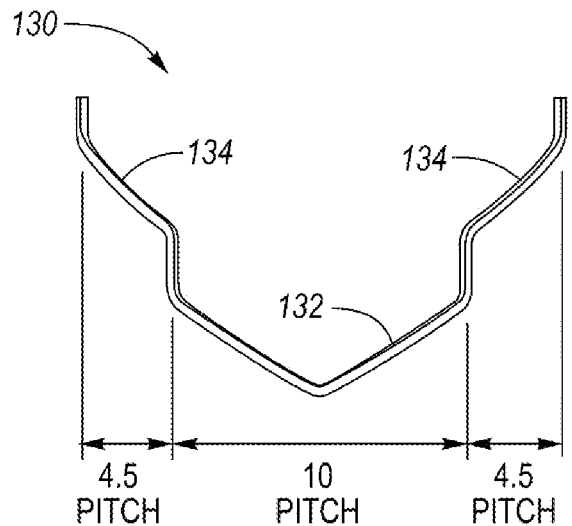
FIG. 5 is a front view of a typical hairpin of a first type.
Figure 7:
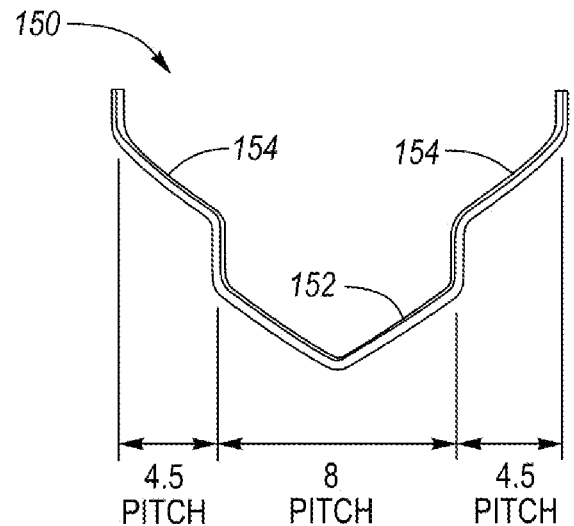
FIG. 7 is a front view of a typical hairpin of a third type.
Figure 6:
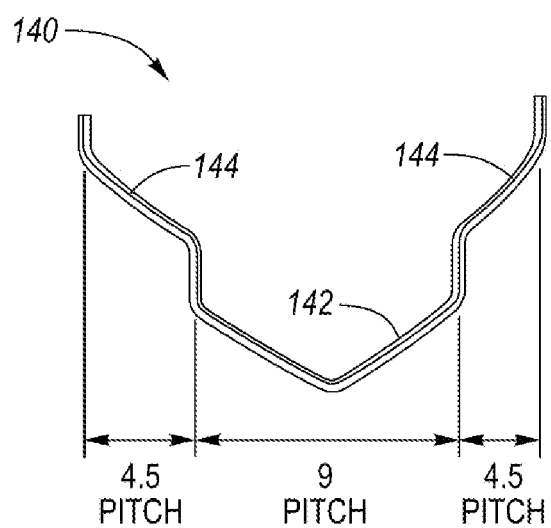
FIG. 6 is a front view of a typical hairpin of a second type.
Figure 8:
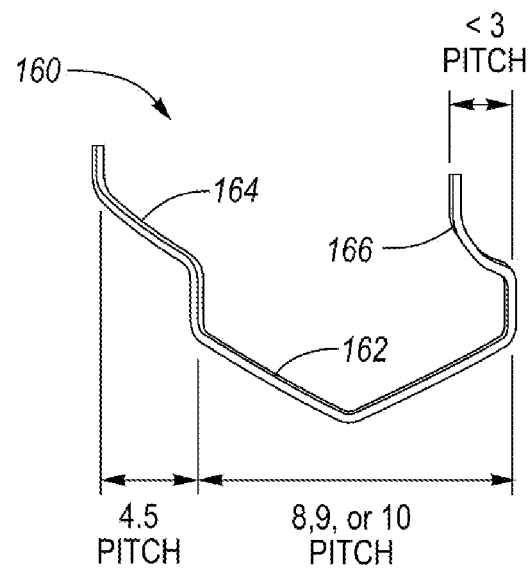
FIG. 8 is a front view of an atypical hairpin.

Referring to FIGS. 5-8, various types of hairpins that are utilized to form the hairpin windings 40 are illustrated. FIGS. 5-7 depict typical hairpins that have outwardly extending twist portions (i.e., twist portions with a positive twist pitch) while FIG. 8 depicts an atypical hairpin having one outwardly extending twist portion and one inwardly extending twist portion (i.e., a twist portion with a negative twist pitch).

The first type of typical hairpin 130, which, is depicted in FIG. 5, has a crown portion 132 having a pitch spanning ten slots 34. The first type of typical hairpin 130 also has first and second outwardly extending twist portions 134 each having a pitch spanning four and one half slots 34. The second type of typical hairpin 140, which is depicted in FIG. 6, has a crown portion 142 having a pitch spanning nine slots 34. The second type of typical hairpin 140 also has first and second outwardly extending twist portions 144 each having a pitch spanning four and one half slots 34. The third type of typical hairpin 150, which is depicted in FIG. 7, has a crown portion 152 having a pitch spanning eight slots 34. The third type of typical hairpin 150 also has first and second outwardly extending twist portions 154 each having a pitch spanning four and one half slots 34.

The atypical hairpin 160, which is depicted in FIG. 8, has a crown portion 162 having a pitch, spanning eight, nine, or ten slots 34. The atypical hairpin 160 also has an outwardly extending twist portion 164 and an inwardly extending twist portion 166 disposed on an opposing end of the atypical hairpin 160 relative to the outwardly extending twist portion 164. The outwardly extending twist portion 164 has a pitch spanning four and one half slots 34 while the inwardly extending twist portion 166 has a pitch spanning less than three slots 34. An atypical hairpin 160 having a crown portion 162 that spans eight slots 34 may be referred to as a first type of atypical hairpin. An atypical hairpin 160 having a crown portion 162 that spans nine slots 34 may be referred to as a second type of atypical hairpin. An atypical hairpin 160 having a crown portion 162 that spans ten slots 34 may be referred to as a third type of atypical hairpin.

Figure 9:
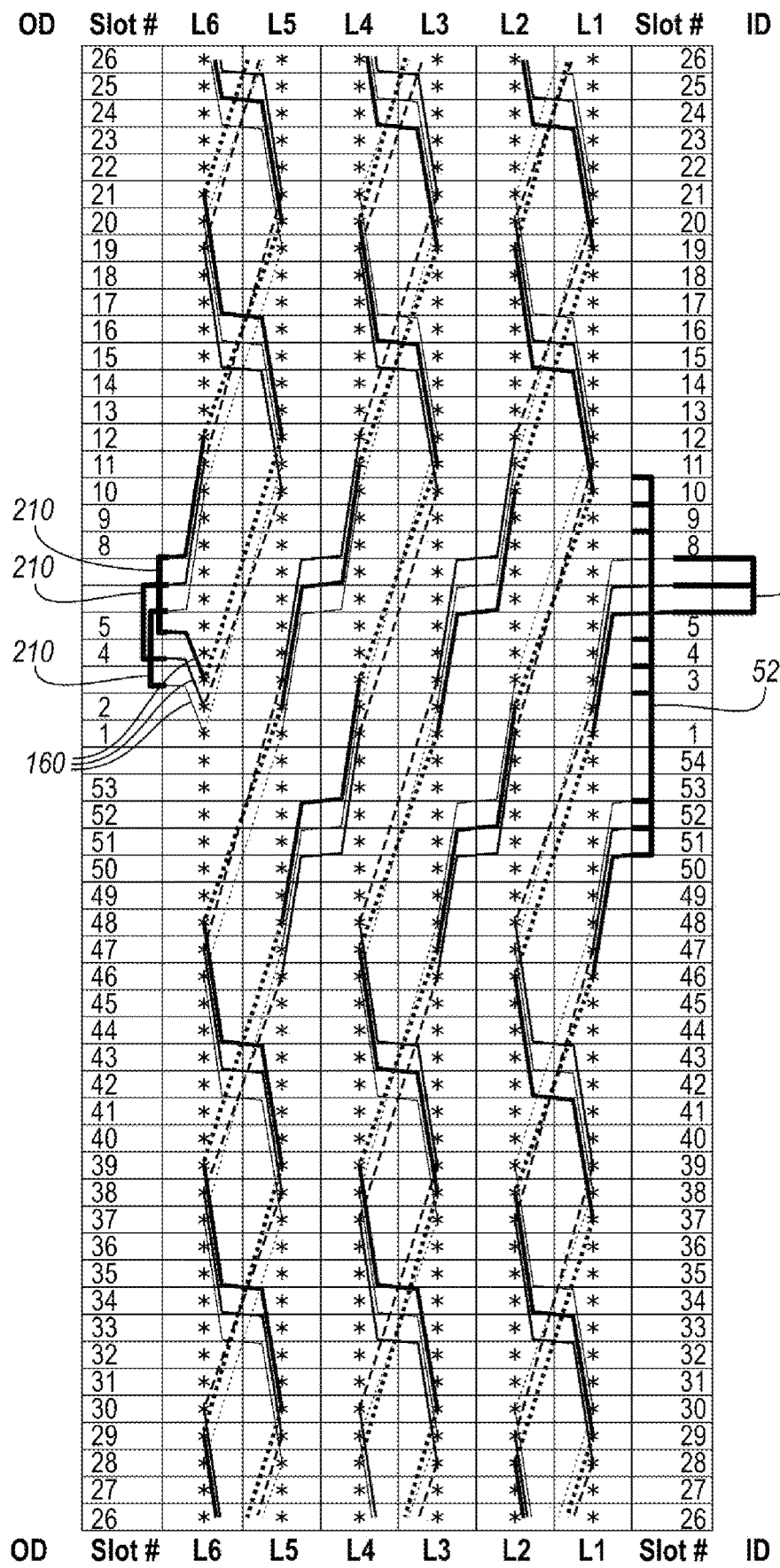
FIG. 9 is a winding diagram of a first of three phases of the stator winding.
Figure 10:
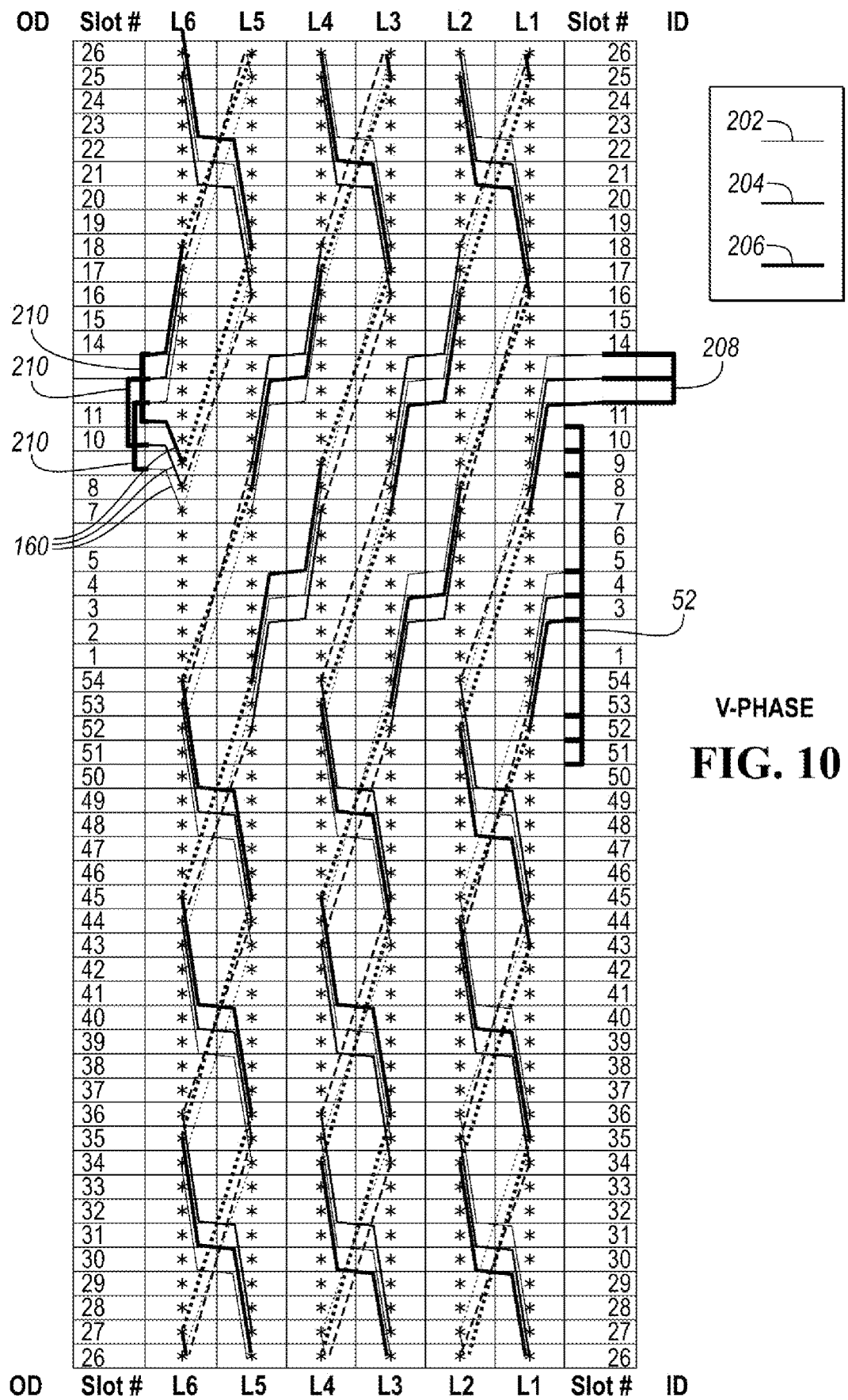
FIG. 10 is a winding diagram of a second of three phases of the stator winding.
Figure 11:
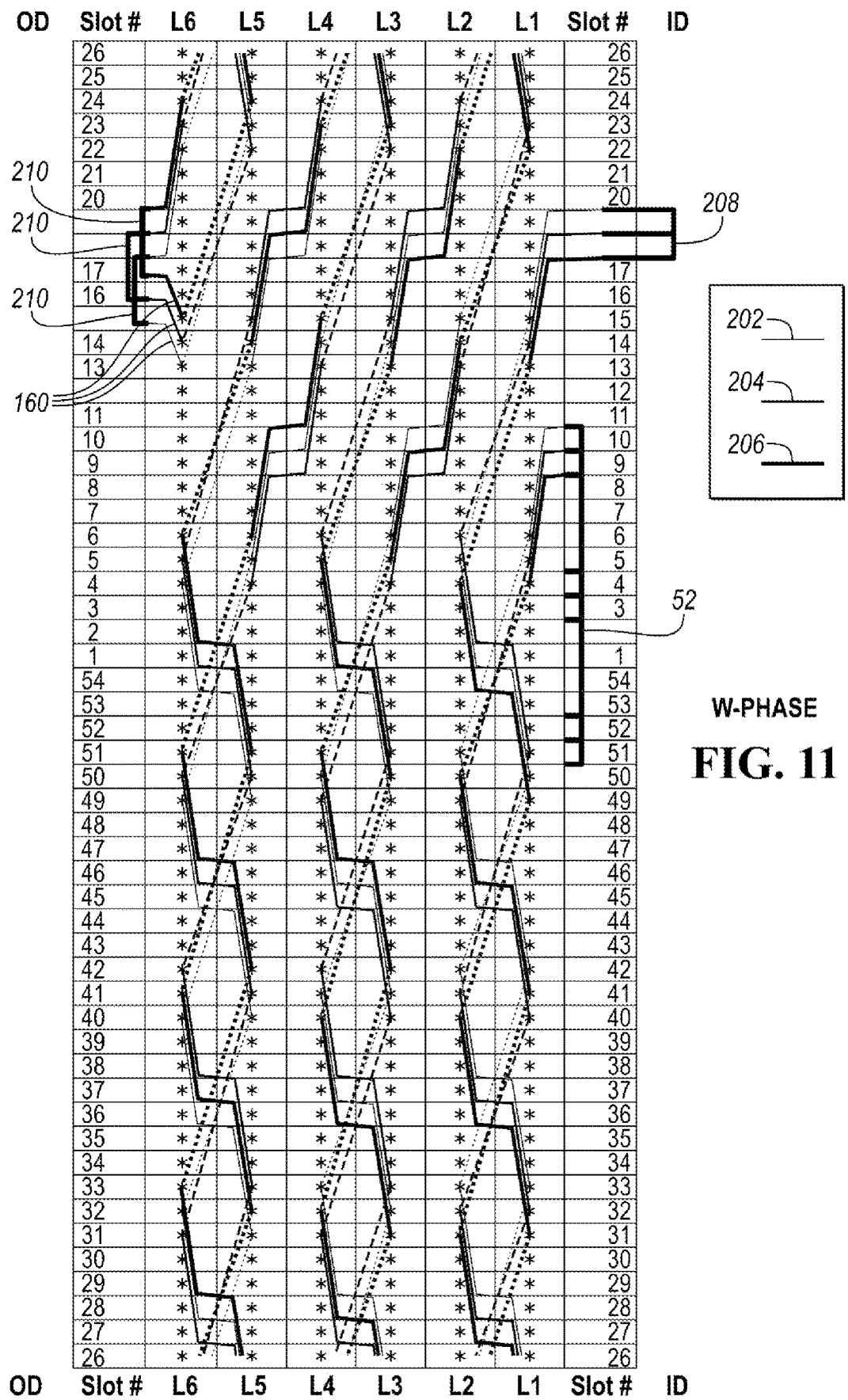
FIG. 11 is a winding diagram of a third of three phases of the stator winding.
Figure 12:
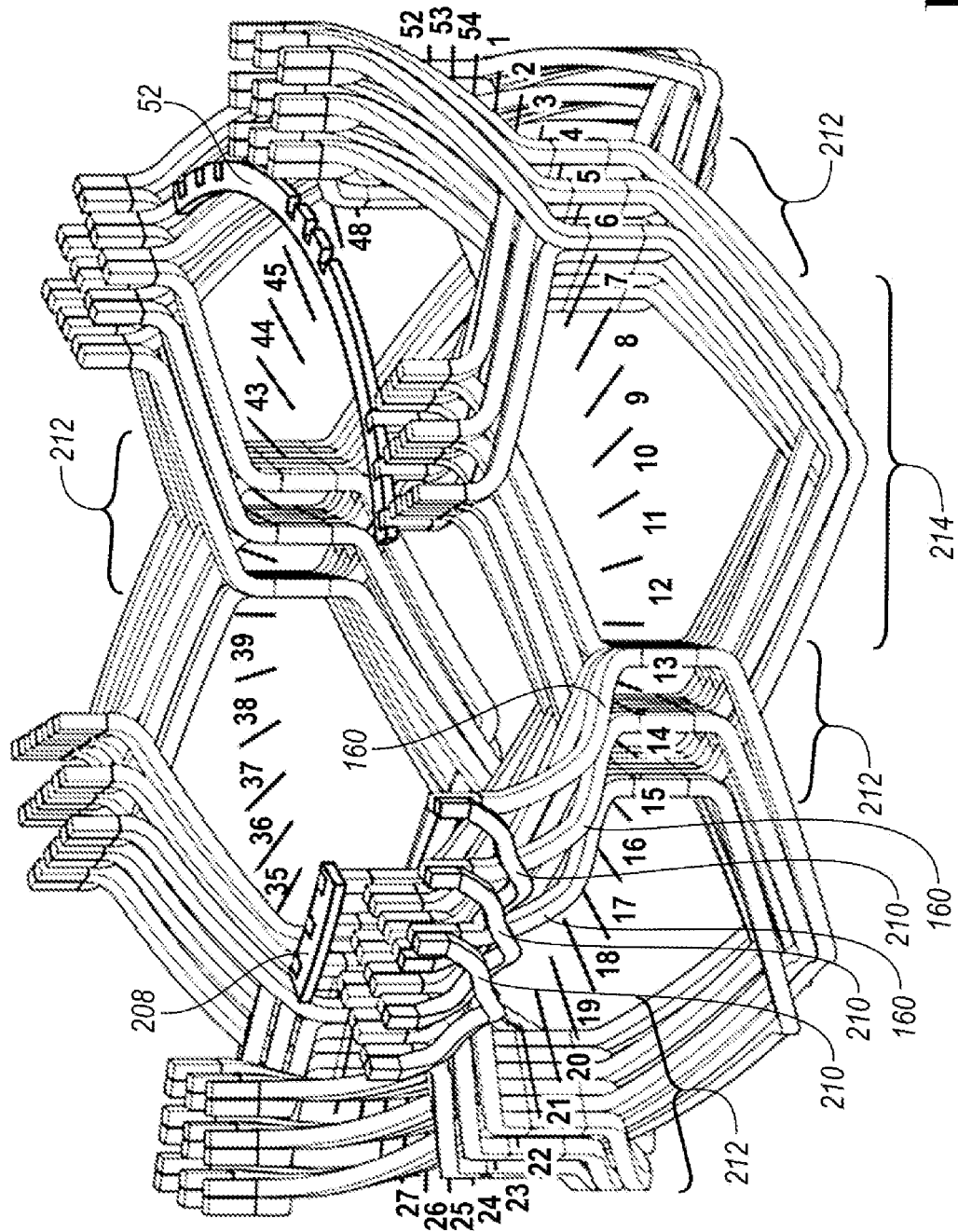
FIG. 12 is a perspective view of one of three phases of the stator winding.
Figure 13:
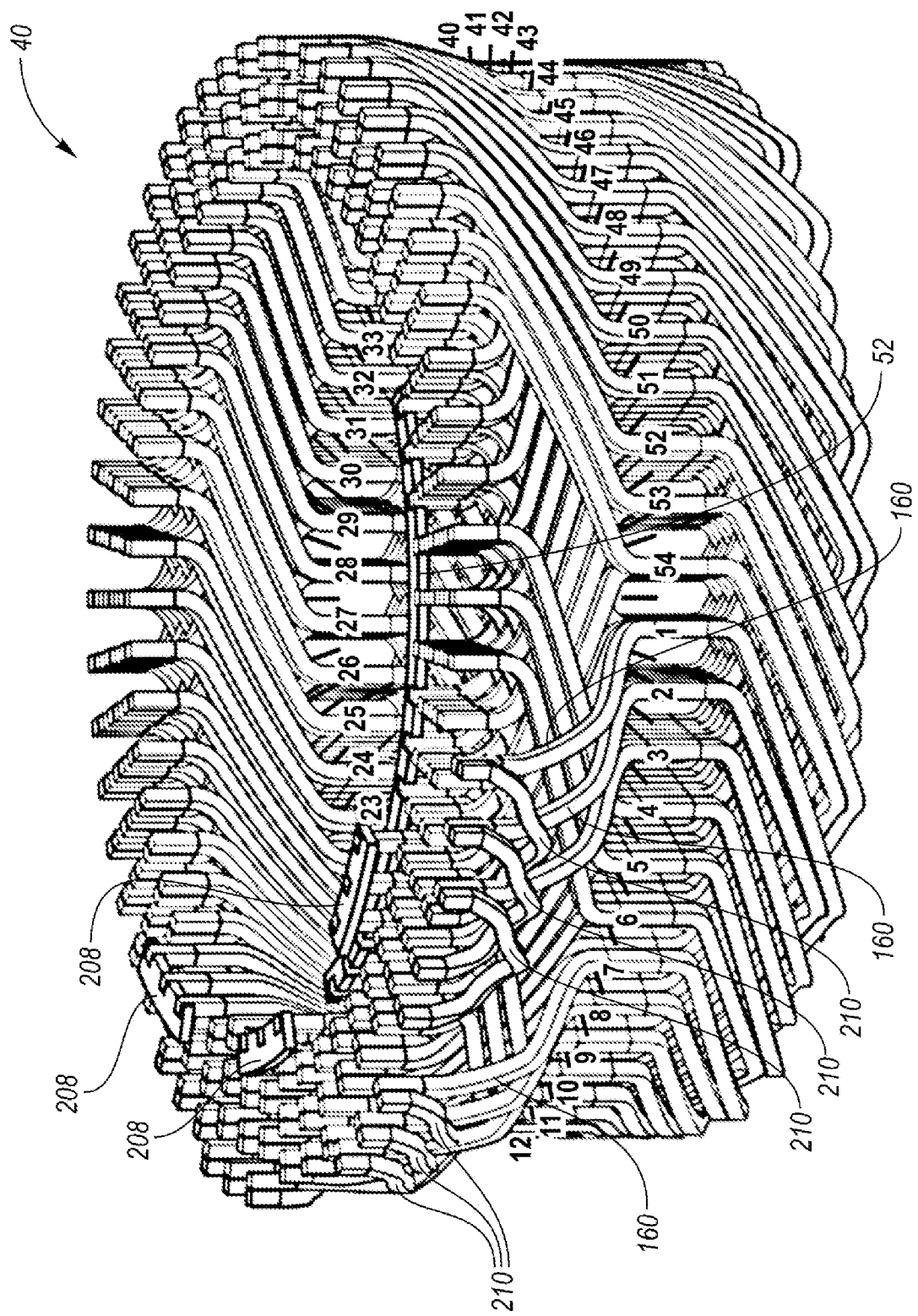
FIG. 13 is a perspective view of all three phases of the stator winding.

Referring now to FIGS. 9-13, the hairpin windings 40 are illustrated in Further detail. Each of the hairpins forming the windings 40 has a structure that corresponds to either the typical hairpins depicted in FIG. 5-7 or the atypical harpins depicted in FIG. 8. Winding diagrams of the three electrical phases of the hairpin windings 40 are depicted FIGS. 9-11, with FIG. 9 representing the U-phase, FIG. 10 representing the V-phase, and FIG. 11 representing the W-phase. The physical structure of the portion of the windings 40 forming the W-phase is illustrated in FIG. 12. The entire physical structure of the windings 40, including all three phases, is illustrated in FIG. 13. It should be noted that the physical structure of each of the phases may be identical. However, each phase may be positioned within the slots 34 such that each phase is offset relative to the other phases. For example, (i) the V-phase may be offset from the U-phase via a pitch of six slots 34 in a first direction and (ii) the W-phase may be offset from the U-phase via a pitch of twelve slots 34 and offset from the V-phase via a pitch, of six slots 34 in the first direction.

For each of the winding diagrams, each column represents a slot location of the stator stack segments having reference numbers from 1 through 54. The slot locations 1 through 54 are also illustrated in FIGS. 12 and 13. Each row represents a radial layer positioned within each respective slot having references L1 toward the inner diameter side through L6 toward the outer diameter side. Each phase (i.e., the U-phase, V-phase, and W-phase) includes a plurality of electrical paths formed by interconnected hairpins of the hairpin windings 40. More specifically, each phase includes a first electrical path 202, a second electrical path 204, and a third electrical path 206. Each electrical path 202, 204, 206 is connected to a terminal lead 208 at a first end and the neutral connection 52 at a second end. The terminal leads 208 may include a body such as a strip of conductive metal or other material. The terminal leads 208 includes openings that connect with the hairpins. Each terminal lead 208 connects one of the phases to a power source (e.g., a battery via an inverter).

Each electrical path 202, 204, 206 is comprised of a plurality of typical hairpins (i.e., hairpins 130, 140, and 150) and an atypical hairpin (i.e., hairpin 160). The atypical, hairpin 160 for each electrical path 202, 204, 206 is connected to one of the typical hairpins via a jumper 210 along the inwardly extending twist portion 166 of the atypical hairpin 160. Each electrical path 202, 204, 206 is comprised of a first sub-path that extends from the inner diameter to the outer diameter of the stator core 32 and a second sub-path that extends from the outer diameter to the inner diameter of the stator core 32. Each first sub-path is connected to a corresponding second sub-path via a jumper 210. The electrical paths 202, 204, 206 of each phase are arranged in parallel to each other from a respective terminal lead 208 to the neutral connection 52. The hairpins of the electrical paths 202, 204, 206 are arranged in groups of three hairpins extending from the ID to OD and from the OD back to the ID, or vice versa. Each group of three includes one hairpin from each electrical path 202, 204, 206. Within each group of three hairpins, one hairpin will have a crown pitch of eight, one hairpin will have a crown pitch of nine, and one hairpin will have a crown pitch of ten, whether or not the hairpins are typical hairpins i.e., hairpins 130, 140, and 150) or atypical hairpins (i.e., hairpin 160).

The jumpers 210 are illustrated as being disposed along an outer periphery, boundary, or diameter of the hairpin windings 40 (e.g., toward the OD of the stator core 32) while the terminal leads 208 and neutral connection 52 are illustrated as being disposed along and inner boundary or diameter of the hairpin windings 40 (e.g., toward the ID of the stator core 32). It should be understood, however, that the wiring of each electrical path 202, 204, 206 of each phase may be reversed or flipped such that the jumpers 210 are disposed along the inner boundary or diameter of the hairpin windings 40 while the while the terminal leads 208 and neutral connection 52 are disposed along an outer periphery, boundary, or diameter of the hairpin windings 40.

Within each wiring diagram, the crowns portions of the hairpins are illustrated as dashed lines, the twist portions are illustrated as a solid lines, and the lines that extend in an almost straight, but slightly angled, direction between the ID to the OD represent where twist portions of adjacent, hairpins are connected to each other. The slot position 1 through 54 that correspondents to a transition between a crown portion and a twist portion represents the slot where a straight portion (e.g., straight portion 99 or straight portion 101) of a corresponding hairpin is disposed.

Referring specifically to FIG. 12, each pole 212 may be represented by the portions of the hairpins of each phase that occupy three consecutive slots of the fifty-four slots. Each phase in turn forms a total of six poles. Although the poles 212 may be represented by the portions of the hairpins of each phase that occupy three consecutive slots, each pole may technically comprise the large loops 214 formed by the hairpins.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The wards used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric machine comprising:
   a stator core defining fifty-four slots that are circumferentially arranged between an inner diameter and an outer diameter of the stator core, each slot having six pin positions that are arranged in a direction that extends from the inner diameter toward the outer diameter; and
   hairpin windings having three electrical phases, each electrical phase having three parallel electrical paths of interconnected hairpins disposed within the slots, each of the electrical paths of interconnected hairpins having first, second, third, and fourth types of hairpins, wherein (i) each of the first type of hairpins has a first crown portion spanning eight slots and first and second opposing outwardly extending twist portions, each of the first and second twist portions spanning four and one half slots, (ii) each of the second type of hairpins has a second crown portion spanning nine slots and third and fourth opposing outwardly extending twist portions, each of the third and fourth twist portions spanning four and one half slots, (iii) each of the third type of hairpins has a third crown portion spanning ten slots and fifth and sixth opposing outwardly extending twist portions, each of the fifth and sixth twist portions spanning four and one half slots, and (iv) each of the fourth type of hairpins has a fourth crown portion, a seventh outwardly extending twist portion, and an inwardly extending twist portion on an opposing side of the fourth crown portion relative to the seventh outwardly extending twist portion.

2. The electric machine of claim 1, wherein each of the fourth type of hairpins is connected to one of the first, second, or third type of hairpins via a jumper at the inwardly extending twist portion.

3. The electric machine of claim 1, wherein each of the fourth type of hairpins is connected to one of the first, second, or third type of hairpins via a jumper and along an outer periphery of the hairpin windings.

4. The electric machine of claim 1, wherein (i) the interconnected hairpins forming the three parallel electrical paths of each electrical phase are arranged in sets of three, (ii) each hairpin of each set of three is from a different electrical path of the three parallel electrical paths, and (iii) each set of three includes one hairpin having a crown pitch of eight, one hairpin having a crown pitch of nine, and one hairpin having a crown pitch of ten.

5. The electric machine of claim 4, wherein each electrical phase has six poles, and wherein each pole is comprised of a portion of the interconnected hairpins that occupy three consecutive slots.

6. An electric machine comprising:
a stator core defining slots that are circumferentially arranged between an inner diameter and an outer diameter of the stator core, each slot having a plurality of pin positions that is arranged in a direction that extends from the inner diameter toward the outer diameter; and
hairpin windings having a plurality of electrical paths of interconnected hairpins disposed within the slots, each of the plurality of electrical paths of interconnected hairpins having a plurality of typical hairpins and an atypical hairpin, wherein (i) each typical hairpin has a crown pitch of eight, nine, or ten, slots and opposing outwardly extending twist pitches along each end of the typical hairpin of four and one half slots, (ii) each atypical hairpin has an outwardly extending twist pitch and an inwardly extending twist pitch on opposing respective ends of the atypical hairpin, (iii) the interconnected hairpins forming the plurality of electrical paths are arranged in sets of three, (iv) each hairpin of each set of three is from a different electrical path of the plurality of electrical paths, and (v) each set of three includes one hairpin having a crown pitch of eight, one hairpin having a crown pitch of nine, and one hairpin having a crown pitch of ten.

7. The electric machine of claim 6, wherein each atypical hairpin is connected to one of the typical hairpins via a jumper along the inwardly extending twist pitch.

8. The electric machine of claim 6, wherein each atypical hairpin is connected to one of the typical hairpins via a jumper and along an outer periphery of the hairpin windings.

9. The electric machine of claim 6, wherein the hairpin windings form three electrical phases.

10. The electric machine of claim 9, wherein each electrical phase is comprised of three of the plurality of electrical paths of interconnected hairpins.

11. The electric machine of claim 10, wherein three electrical paths of interconnected hairpins of each electrical phase are arranged in parallel relative to each other.

12. The electric machine of claim 6, wherein each electrical phase has six poles, and wherein each pole is comprised of a portion of the interconnected hairpins that occupy three consecutive slots.

13. An electric machine comprising:
a stator core defining slots that are circumferentially arranged between an inner diameter and an outer diameter of the stator core, each slot having a plurality of pin positions that is arranged in a direction that extends from the inner diameter toward the outer diameter; and
hairpin windings having a plurality of electrical paths of interconnected hairpins disposed within the slots, each of the plurality of electrical paths of interconnected hairpins having a plurality of typical hairpins and a single atypical hairpin, wherein (i) each typical hairpin has first and second opposing outwardly extending twist portions, (ii) each atypical hairpin has a third outwardly extending twist portion and an inwardly extending twist portion disposed on an opposing end of the atypical hairpin relative to the third outwardly extending twist portion, (iii) each atypical hairpin is connected to one of the typical hairpins via a jumper at the inwardly extending twist portion and along a boundary of the hairpin windings, (iv) each atypical hairpin has a crown that spans eight, nine, or ten slots, (v) the third outwardly extending twist portion of each atypical hairpin spans four and one half slots, and (vi) the inwardly extending twist portion of each atypical hairpin spans less than three slots.

14. The electric machine of claim 13, wherein each typical hairpin has a crown that spans eight, nine, or ten slots.

15. The electric machine of claim 14, wherein the first and second opposing outwardly extending twist portions of each typical hairpin spans four and one half slots.

16. The electric machine of claim 13, wherein (i) the interconnected hairpins forming the plurality of electrical paths are arranged in sets of three, (ii) each hairpin of each set of three is from a different electrical path of the plurality of electrical paths, and (iii) each set of three includes one hairpin having a crown pitch of eight, one hairpin having a crown pitch of nine, and one hairpin having a crown pitch of ten.

17. The electric machine of claim 13, wherein-(i) the hairpin windings form three electrical phases.

18. The electric machine of claim 17, wherein each electrical phase is comprised of three of the plurality of electrical paths of interconnected hairpins.

19. The electric machine of claim 18, wherein the three electrical paths of interconnected hairpins of each electrical phase are arranged in parallel relative to each other.

20. The electric machine of claim 17, wherein each electrical phase has six poles.

* * * * *